(12) United States Patent
Perrin et al.

(10) Patent No.: US 10,434,983 B2
(45) Date of Patent: Oct. 8, 2019

(54) ANTI-THEFT FOR A STEERING COLUMN OF A MOTOR VEHICLE

(71) Applicant: U-SHIN FRANCE, Creteil (FR)

(72) Inventors: Christophe Perrin, Créteil (FR); Patrice Poggi, Créteil (FR); Philippe Demptos, Créteil (FR); Patrick Tapin, Créteil (FR)

(73) Assignee: U-SHIN FRANCE, Créteil (FR)

( * ) Notice: Subject to any disclaimer, the term of this patent is extended or adjusted under 35 U.S.C. 154(b) by 0 days.

(21) Appl. No.: 15/475,371

(22) Filed: Mar. 31, 2017

(65) Prior Publication Data

US 2017/0203718 A1   Jul. 20, 2017

Related U.S. Application Data

(63) Continuation of application No. PCT/EP2015/072616, filed on Sep. 30, 2015.

(30) Foreign Application Priority Data

Oct. 1, 2014  (FR) ...................................... 14 59370

(51) Int. Cl.
  *B60R 25/021*  (2013.01)
  *E05B 29/00*  (2006.01)
(52) U.S. Cl.
  CPC .. *B60R 25/02131* (2013.01); *B60R 25/02105* (2013.01); *B60R 25/02115* (2013.01); *E05B 29/0026* (2013.01)
(58) Field of Classification Search
  CPC . B60R 25/02; B60R 25/021; B60R 25/02105; B60R 25/0211;

(Continued)

(56) References Cited

U.S. PATENT DOCUMENTS 3,724,244 A * 4/1973 Schaumburg ..... B60R 25/02131
                                                   70/252
4,495,786 A * 1/1985 Masaki ............ B60R 25/02128
                                                   70/186

(Continued)

FOREIGN PATENT DOCUMENTS

AU          642452      6/1991
DE         2713381      9/1977

(Continued)

OTHER PUBLICATIONS

International Search Report for International Application PCT/EP2015/072616, dated Dec. 18, 2015.

*Primary Examiner* — Christopher J Boswell

(74) *Attorney, Agent, or Firm* — Burris Law, PLLC

(57) ABSTRACT

A lock for an antitheft device for a motor vehicle steering column is provided and includes a stator having a stator head with an opening, a rotor rotatably mounted about an axis with respect to the stator having an annular flange, a cam to rotate as one with the rotor, and an elastic element arranged between the cam and the rotor in order to exert a thrust load axially on the rotor. The opening of the stator is designed to engage with the annular flange to prevent the rotor from rotating in a predetermined rotation direction from a predetermined angular position and allows the rotor to rotate beyond the predetermined angular position by prior depression of the rotor.

13 Claims, 4 Drawing Sheets

(58) Field of Classification Search
CPC ......... B60R 25/02115; B60R 25/02126; B60R 25/02128; B60R 25/02131
See application file for complete search history.

(56) References Cited

U.S. PATENT DOCUMENTS

| | | | |
|---|---|---|---|
| 4,516,415 A * | 5/1985 | Kobayashi | B60R 25/02131 70/186 |
| 4,581,909 A * | 4/1986 | Weber | B60R 25/021 70/186 |
| 4,771,619 A * | 9/1988 | Shiramizu | B60R 25/02128 70/186 |
| 5,036,686 A * | 8/1991 | Ichinose | B60R 25/02142 70/186 |
| 5,289,705 A * | 3/1994 | Grimmer | B60R 25/02121 70/237 |
| 5,315,851 A * | 5/1994 | Kuroki | B60R 25/02131 70/186 |
| 5,570,599 A * | 11/1996 | Konii | B60R 25/02126 70/186 |
| 5,653,131 A * | 8/1997 | Shibata | E05B 17/14 70/185 |
| 6,003,349 A | 12/1999 | Nagae et al. | |
| 6,826,934 B2 * | 12/2004 | Canard | B60R 25/02131 70/181 |
| 8,146,396 B2 * | 4/2012 | Giacomin | B60R 25/02115 70/186 |
| 9,816,290 B2 * | 11/2017 | Yamaguchi | E05B 29/0053 |
| 9,827,948 B2 * | 11/2017 | Della Fiorentina | B60R 25/02131 |
| 2002/0178769 A1* | 12/2002 | Okuno | B60R 25/02126 70/186 |
| 2016/0257285 A1* | 9/2016 | Poggi | B60R 25/02102 |

FOREIGN PATENT DOCUMENTS

| | | |
|---|---|---|
| EP | 0254176 | 1/1988 |
| FR | 2205873 | 5/1974 |
| GB | 2376044 | 12/2002 |
| JP | 6374359 | 5/1988 |
| WO | 2009/104453 | 8/2009 |
| WO | 2012/059424 | 5/2012 |

* cited by examiner

F1 ↑

F2 ↓

ANTI-THEFT FOR A STEERING COLUMN OF A MOTOR VEHICLE

CROSS-REFERENCE TO RELATED APPLICATIONS

This application is a continuation of International Application No. PCT/EP2015/072616, filed on Sep. 30, 2015, which claims priority to and the benefit of FR 14/59370 filed on Oct. 1, 2014. The disclosures of the above applications are incorporated herein by reference.

FIELD

The present disclosure relates to a lock for a steering column anti-theft of a motor vehicle.

BACKGROUND

The statements in this section merely provide background information related to the present disclosure and may not constitute prior art.

It is known that anti-theft devices for steering columns, comprising at least, a stator, a rotor and a cam, may be held in distinct positions thanks to different indexed angular positions:

a neutral extreme angular "Stop" position, in which the anti-theft locks the steering column;

an intermediate angular "On" position, in which the vehicle is electrically powered, and enables the start-up of the thermal engine of the vehicle; and an active extreme angular "Start" position, in which besides the "On" functions, the starter is powered to start up the thermal engine of the vehicle.

Of course, other positions may exist such as for example the intermediate angular "Accessories" position, allowing to electrically power some accessories, such as the radio, typically disposed between the neutral extreme angular "Stop" position and the intermediate angular "On" position.

Once the engine is operated, the anti-theft is automatically brought back from the "Start" position to the "On" position by a return force. The "On" position is the position used during the running of the vehicle.

There is known a mechanical indexing system which allows holding the key, rotor, and cam assembly in a stable position unless an intentional action of the user modifies this position in order, for example, to shut off the engine by turning the key from the "On" position to the "Stop" position. An "intentional action of the user" is called a simple rotation of the key against the indexing torque, for example in the range of 0.2 to 0.4 N·m.

A first drawback of this type of lock is that the key may come out from its indexed position in the event of unintentional action of the type "knee kick on the key when driving". In this case, the anti-theft may then reach an angular position where the electric "On" functions are no longer ensured, and therefore cause the unintentional stopping of the engine when running.

A second drawback of this type of lock is that, during an engine start, because of the automatic return of the key into the "on" position by spring return, if the key is brutally released without hand assistance from the "Start" position to the "On" position, the indexed "On" position may be exceeded due to the inertia of the key, rotor, and cam assembly. The anti-theft is then positioned in a non-indexed (and non-stable) angle. Consequently, the running vibrations may bring the anti-theft in an angular position where the electric "On" contact is lost, resulting in an unintentional stopping of the engine.

SUMMARY

The present disclosure provides a lock for a steering column anti-theft of a motor vehicle comprising:

a stator comprising a stator head in which an opening is arranged, a rotor movably mounted in rotation relative to the stator about an axis and comprising an annular collar, a cam intended to be rotatably secured to the rotor, and an elastic element arranged between the cam and the rotor for axially biasing said rotor by pushing, wherein the opening is shaped so that its cooperation with the annular collar blocks the rotation of the rotor in a predetermined direction of rotation from a predetermined angular position and enables the rotation of the rotor beyond the predetermined angular position by pressing the rotor beforehand.

Such a lock for a steering column anti-theft of a motor vehicle presents a new kinematic of the rotor to switch from the intermediate angular "On" position to the neutral extreme angular position called "Stop" position related to the stopping of the engine. Thus, when the anti-theft is in the "On" position, the user pushes the key in order to perform the rotation in the direction of the "Stop" position.

If the key is not pushed, its rotation is inhibited. Thus, it may not be possible, in the event of unintentional action of the type "knee kick on the key when driving", to get the key out of its indexed position by causing the unintentional stopping of the engine when running.

Similarly, it may not be possible to cause the unintentional stopping of the engine during the automatic return of the key into the "On" position by a return force, when the key is brutally released without hand assistance from the active extreme angular "Start" position to the "On" position.

Thus, the lock of the present disclosure allows, in a simple and very effective manner, to reduce the security issues of the prior art.

According to one form, the lock for a steering column anti-theft of a motor vehicle according to the present disclosure comprises one or more of the following features, considered separately or in combination:

the annular collar comprises an extension which extends axially toward the head of the rotor intended to receive an insert over a first angular sector; and the opening is substantially circular and includes a clearance for enabling the passage of the extension of the annular collar, the clearance extending radially outward of the opening over a second angular sector and being shaped so that its cooperation with the annular collar retains axially the rotor in the head of the stator;

the predetermined angular position is an intermediate angular position disposed between a neutral extreme angular position and an active extreme angular position; and the opening is shaped so that its cooperation with the annular collar enables the rotation of the rotor in a direction of rotation opposite to the predetermined direction of rotation up to an active extreme angular position, such as the start position.

According to another form, the present disclosure also teaches a steering column anti-theft for a motor vehicle, characterized in that it includes at least one lock as defined hereinbefore.

In the context of the present disclosure, for an element extending in the space in three perpendicular directions, said element is defined as a radial extension, namely an extension extending radially, if its size in a direction parallel to a radius of the rotor is larger than its size in the two other perpendicular directions; and said element is defined as an axial extension, namely an extension extending axially, if its size in a direction parallel to the axis of rotation of the rotor is larger than its size in the two other perpendicular directions.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In the different figures, the similar elements are indicated by identical reference numerals. Furthermore, the different elements are not necessarily to scale in order to present a view allowing facilitating the understanding of the present disclosure.

Figure 1:
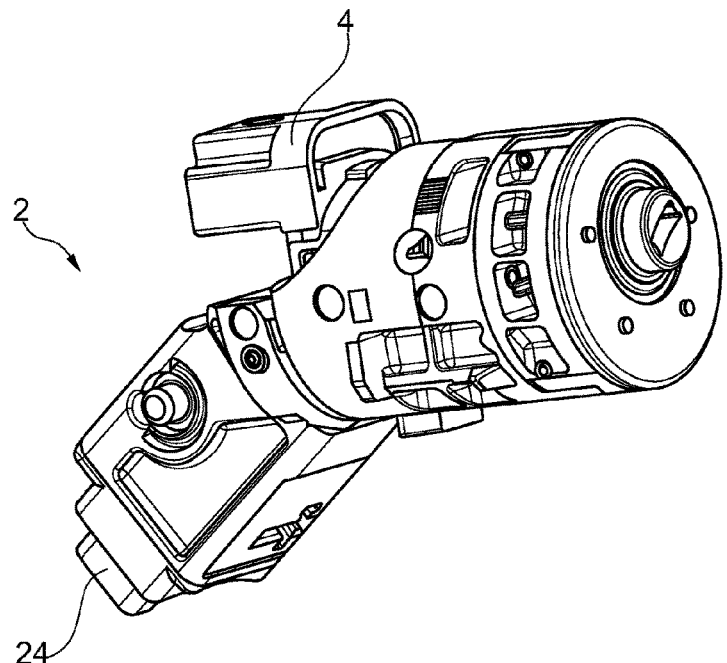
FIG. 1 is a perspective view of a steering column anti-theft for a motor vehicle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates a steering column anti-theft 2, with an insertable lock, intended to be mounted in a motor vehicle so as to secure its direction. The anti-theft 2 comprises an anti-theft body 4 inside which a lock 6 is intended to be inserted and secured.

Figure 2:
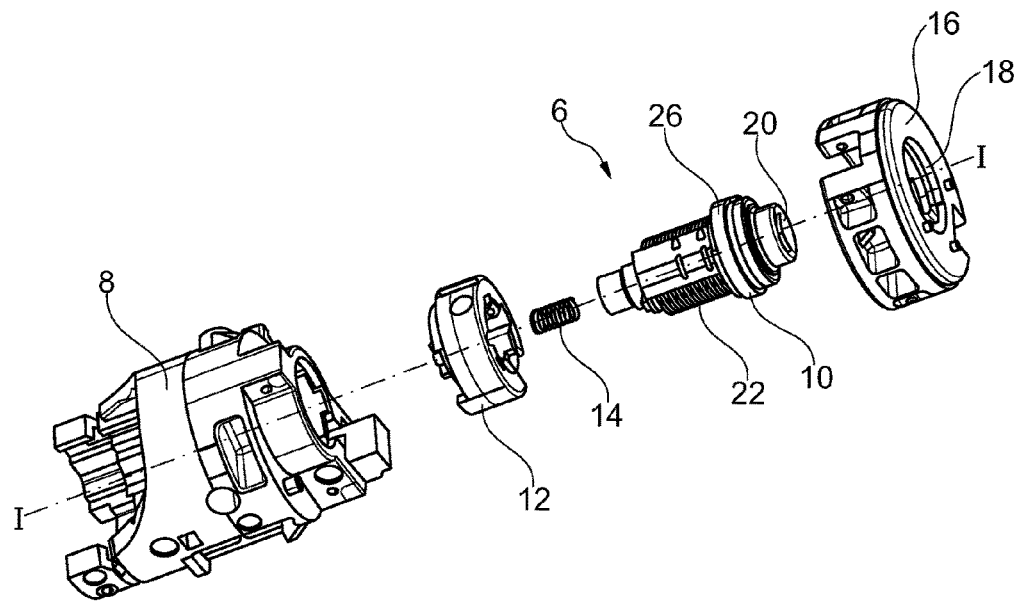
FIG. 2 is an exploded view of the lock of the anti-theft of FIG. 1.

As represented in the exploded view of FIG. 2, the lock 6 includes a stator 8, a rotor 10, a cam 12 and an elastic element 14.

The stator 8 comprises a stator 16 head. The head of the stator 16 may be secured to the anti-theft body 4. At the front, an opening 18 is arranged in the rotor head in order to provide access to the head of the rotor. At the rear, the stator 16 head has a housing with a shape adapted to receive the rotor 10, for example a general cylindrical shape.

The rotor 10 is movably mounted in rotation relative to the stator about an axis noted I-I. The rotor can be movable in axial rotation about this axis I-I by rotational driving of a key insert so as to control a locking means of the anti-theft 2.

The rotor 10 has a key inlet 20 arranged at the front end also called rotor head. It is understood that, throughout this text, the term rotor refers, in a very general manner, to any sub-assembly comprising a rotor body through which are arranged radial slots 22 capable of receiving flakes which are movably mounted in radial translation and which are coupled to return springs bringing them permanently in protruding positions with respect to the body of the rotor. The flakes allow the release of the rotor when a key insert corresponding to the coding formed by the arrangement of the flakes is introduced in the rotor.

The rotation of the key may cause the rotation of the rotor 5 in a first neutral extreme angular position, called neutral position, such as the "Stop" position, two intermediate angular positions, called "On" and "Accessories" positions and a second active extreme angular position, opposite to the first neutral extreme angular position, called "Start" position.

The "Neutral", "Intermediate" and "Start" positions follow one another when the rotor 10 is displaced from the "Neutral" position toward the "Start" position. After passing through the start position, the rotor 10 is resiliently brought back to its intermediate "On" position by a return spring.

The locking means includes a bolt 24 movably mounted between a retracted position in which the bolt 24 is kept away from a steering column (not represented) and a protruding position, as illustrated in FIG. 1, in which it blocks the steering column of the motor vehicle.

For this purpose, the cam 12 is intended to be rotatably secured to the rotor, so that the rotation of the rotor 10 allows controlling the translation of the bolt 24.

The bolt 24 is generally in a protruding position in the steering column when the rotor 10 is in the neutral position, the bolt 24 being kept stowed, in the retracted position, in the other angular positions of the rotor 10. The bolt 24 is biased by pushing in the protruding position by a bolt spring.

The elastic element 14 is arranged coaxially between the cam 12 and the rotor 10 so as to axially bias said rotor 10 by pushing. For example, the elastic element 14 is a compression spring. Thus, the spring 10 is slidably linked to the cam 12, that is to say that the rotor 10 is linked in rotation with the cam 12 but not in translation, the elastic element 14 pushing the rotor 10 in a non-pressed position.

Furthermore, the rotor 10 comprises an annular collar 26.

According to the present disclosure, the opening 18 is shaped so that its cooperation with the annular collar 26 blocks the rotation of the rotor 10 in a predetermined direction of rotation from a predetermined angular position and enables the rotation of the rotor 10 beyond the predetermined angular position by prior pressing of the rotor.

According to one form of the present disclosure, the predetermined angular position is an intermediate angular position, for example the "On" position, disposed between a neutral extreme angular position, the "Stop" position and an active extreme angular position, the "Start" position.

By this means, the key cannot be extracted from the lock 6 by a simple removal movement in the "Stop" position. It may be necessary to press the key beforehand in the lock 6 in order to be able to extract it therefrom afterwards. Thus, any unintended or malevolent extraction of the key may be inhibited, in particular because of the danger that the extraction of the key poses when the vehicle is running.

Figure 3:
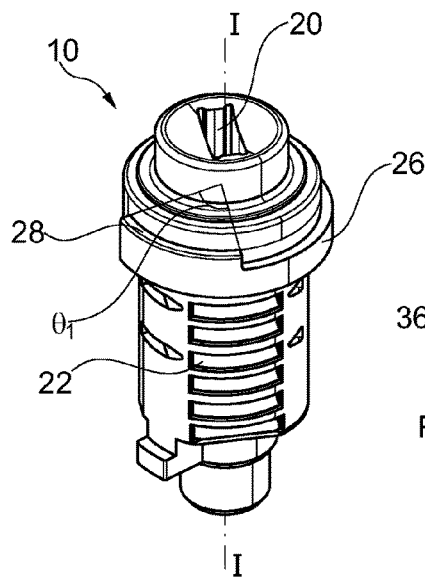
FIG. 3 is a perspective view of the rotor of the lock of FIG. 2.
Figure 4:
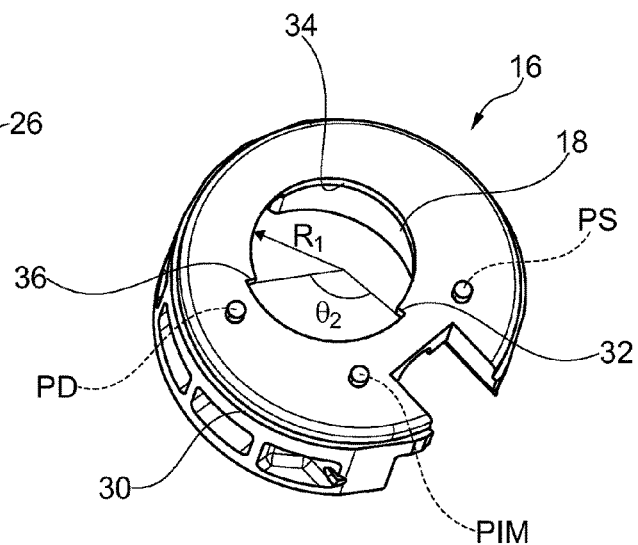
FIG. 4 is a perspective view of the stator head of FIG. 2.

According to one form of the present disclosure, shown in FIGS. 3 and 4, the annular collar 26 comprises an extension 28 which extends axially toward the head of the rotor 10 over a first angular sector with an angle θ1.

Furthermore, the opening 18 is substantially circular with a radius R1 and includes a clearance 30 for enabling the passage of the extension 28 of the annular collar 26. The clearance 30 extends radially outward of the opening 18 over a second angular sector with an angle noted θ2. In other words, over the second angular sector with the angle noted θ2, the assembly formed by the opening 18 and the clearance 30 is substantially circular with a radius R2 larger than the radius R1. The angle θ2 is at least equal to the angle θ1.

The clearance 30 also includes a radial stop 32 shaped to block the rotation of the rotor 10, during the rotation of the rotor 10 in the counterclockwise direction from the predetermined angular position.

In addition, the clearance 30 is shaped so that its cooperation with the annular collar 26 retains axially the rotor 10 in the head of the stator 16. To this end, the stator 16 head has an axial stop 34 located at the front side of the rotor. The axial stop 34 is shaped to retain axially the rotor 10 in the stator 16 head while enabling the pressing of the rotor 10.

Figure 5:
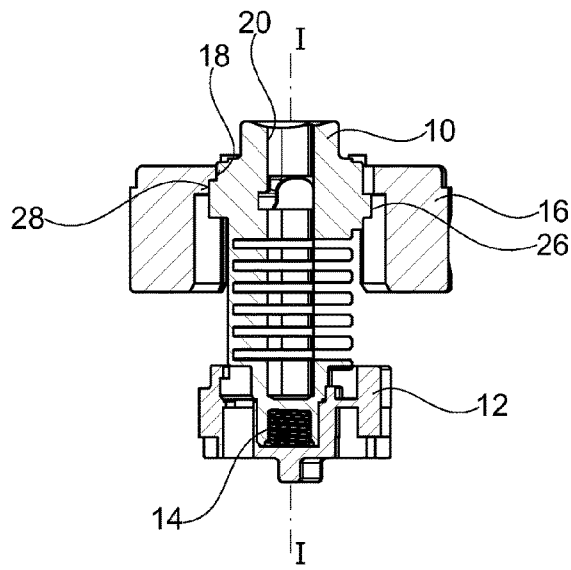
FIGS. 5 and 6 are cross-sectional views of the lock of FIG. 2 respectively when the rotor is in a position called "stowed" position (FIG. 5) and a position called "deployed" position (FIG. 6)
Figure 6:
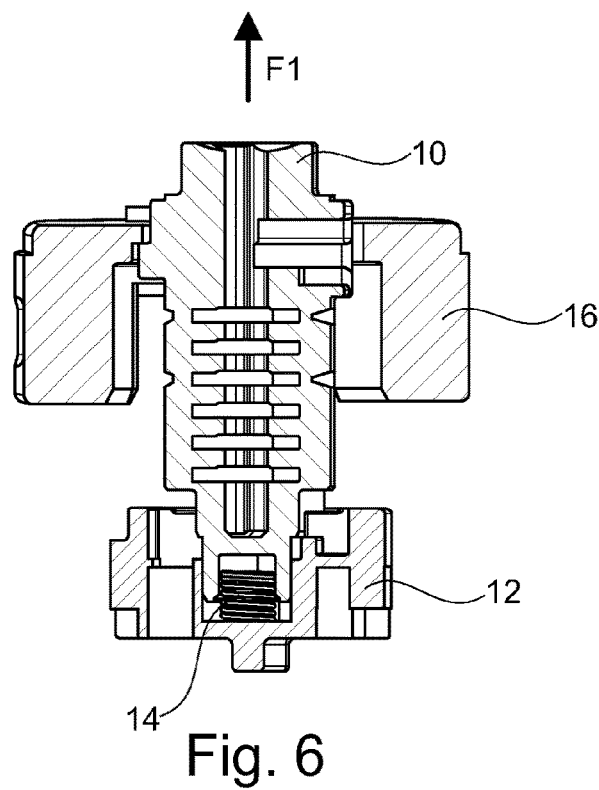
Figure 7:
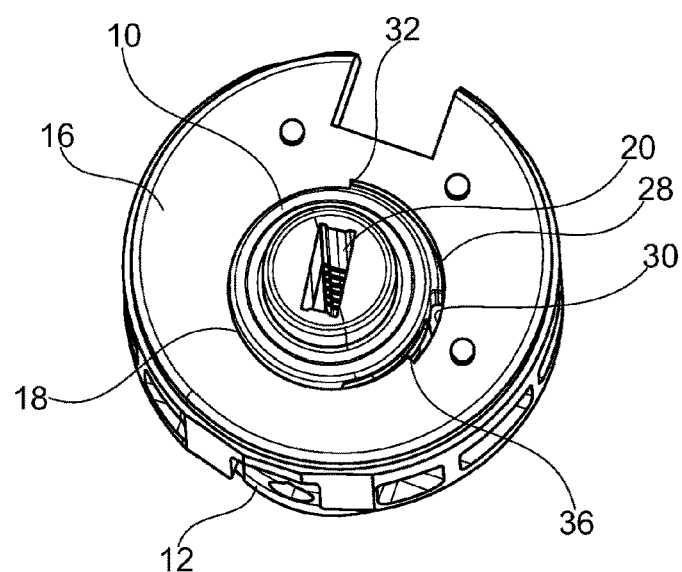
FIG. 7 illustrates a perspective view of the lock of FIG. 2 with the rotor of the lock in the "deployed" position.

In other words:

when the extension 28 of the annular collar 26 does not face the clearance 30, the rotor is retained in translation in a position called "stowed" position as illustrated in FIG. 5; and when the extension 28 of the annular collar 26 faces the clearance 30, the rotor is pushed by the elastic element 14 and consequently translates along the axis I-I into a position called "deployed" position as illustrated in FIGS. 6 and 7.

According to another form, the opening is further shaped so that its cooperation with the annular collar 26 enables the rotation of the rotor in a direction of rotation opposite to the predetermined direction of rotation up to an active extreme position, such as the "Start" position. Thus, according to the present disclosure, the angle θ2 is larger than the angle θ1 thereby enabling a rotation of the rotor 10 in the clockwise direction between the "On" position and the "Start" position, that is to say when the rotor 10 is in the "deployed" position.

The clearance 30 further includes an additional radial stop 36 corresponding to the "Start" position shaped to block the rotation of the rotor 10 in the direction of rotation opposite to the predetermined direction of rotation, that is to say in the clockwise direction beyond the "Start" position.

An example of operation of the lock will now be described with reference to FIGS. 8 to 10.

Figure 8:
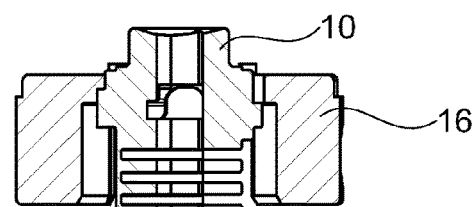
FIGS. 8 and 9 are cross-sectional views of the lock of FIG. 2 respectively when the lock is in the "Stop" (FIG. 8) and "On" (FIG. 9) positions.

It is assumed, with reference to FIG. 8, that the vehicle is stopped and that the driver introduces the key (not represented) in the rotor 10 along the axis I-I so as to start up the vehicle. The lock 6 is then in the angular "Stop" position indicated PS in FIG. 4. The rotor is in the "stowed" position.

Then, the user begins turning the key in the clockwise direction of rotation, making the rotor 10 turn in the stator 16 head. As long as the lock 6 has not reached the predetermined angular position, for example the intermediate "Start" position PIM, the rotor 10 remains in the "stowed" position.

Figure 9:
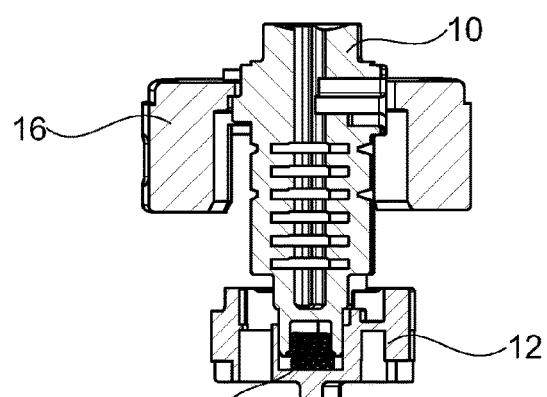
Figure 10:
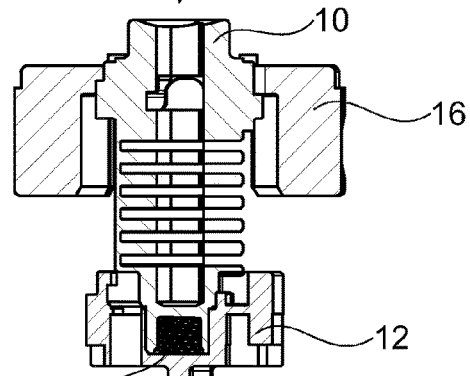
FIG. 10 is a view similar to FIG. 9, illustrating the driver pressing the rotor to switch from the "On" position to the "Stop" position in order to be able to remove the key.

When the rotor 10 reaches the predetermined intermediate position for example the "On" position PIM (FIG. 9), the rotor 10 translates into the "deployed" position under the action of the spring 14 according to the arrow F1 (FIG. 9).

The axial stop 34 axially retains the rotor 10 in the stator 16 head in this "deployed" position.

As soon as the rotor 10 reaches this "deployed" position, the extraction of the key is inhibited.

The rotation of the rotor 10 may be continued in the clockwise direction up to the "Start" position. Between the predetermined angular position, herein the intermediate "On" position and the angular "Start" position, the rotor 10 remains in the "deployed" position under the action of the spring 14 and is retained in the stator 16 head by the axial stop 34.

The rotation of the rotor 10 in the clockwise direction is inhibited beyond the "Start" position by the abutment of the extension 28 of the collar 26 against the radial stop 36.

After the engine starts in the "Start" position, the lock automatically returns in the "On" position, the rotor remaining in the "Deployed" position during its rotation in the counterclockwise direction.

From the predetermined angular position, the "On" position in this example, when the driver turns the key in the reverse direction (counterclockwise direction of rotation), the rotation of the rotor 10 is prohibited by the abutment of the extension 28 of the collar 26 against the radial stop 32. Hence, it may not be possible to make the rotor 10 turn from the intermediate "On" position PIM in order to make it return to the "Stop" position and remove the key.

In this stop position, the driver then presses the rotor 10 into the stator 16 head (arrow F2 in FIG. 10), thereby enabling overcoming the radial stop 32 by the extension 28 of the collar 26.

Before reaching the "Stop" position PS, the rotor 10 returns into the initial "stowed" position (FIG. 8) until the abutment of the extension 28 of the collar 26 against the axial stop 34.

Then, the driver continues turning the rotor 10 until reaching the stop position in which the driver can then extract the key from the lock 6.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A lock for a steering column anti-theft device of a motor vehicle comprising:
    a stator comprising a stator head having an opening;
    a rotor movably mounted in rotation relative to the stator about an axis, the rotor comprising an annular collar having an extension, wherein the annular collar and the extension are not moveable relative to each other;
    a cam rotatably secured to the rotor; and
    an elastic element arranged between the cam and the rotor for axially biasing said rotor by pushing;
    wherein the opening of the stator is shaped so that it cooperates with the annular collar to block rotation of the rotor in a predetermined direction of rotation to a first angular position from a position in which the rotor is at a predetermined angular position and a predetermined axial position,
    wherein when the rotor is in the position in which the rotor is at the predetermined angular position and the predetermined axial position, the rotor is axially translatable to a first axial position,
    wherein the annular collar and the opening of the stator are shaped to enable rotation of the rotor in the predetermined direction of rotation to the first angular position from a position in which the rotor is at the predetermined angular position and the first axial position;

wherein when the rotor is in the first angular position, a key disposed in the rotor may be removed from the rotor and when the rotor is in the predetermined angular position, the key disposed in the rotor may not be removed from the rotor;

wherein the extension of the annular collar extends axially toward a head of the rotor to receive an insert over a first angular sector, and wherein the opening of the stator includes a clearance for enabling passage of the extension of the annular collar, the clearance extending radially outward of the opening of the stator over a second angular sector and being shaped so that its cooperation with the extension of the annular collar of the rotor axially retains the rotor in the head of the stator.

2. The lock according to claim 1, wherein the predetermined angular position is an intermediate angular position disposed between a neutral extreme angular position and an active extreme angular position.

3. The lock according claim 1, wherein the opening of the stator is shaped so that its cooperation with the annular collar enables rotation of the rotor in a direction of rotation opposite to the predetermined direction of rotation up to an active extreme angular position.

4. A steering column anti-theft for a motor vehicle including a lock according to claim 1.

5. The lock according to claim 1, wherein the stator head has an axial stop retaining the rotor in the stator head when the rotor translates.

6. The lock according to claim 1, wherein the clearance includes a radial stop shaped to block the rotation of the rotor, so that a driver has to press the rotor into the stator head, thereby enabling overcoming the radial stop by the extension of the collar.

7. A lock for a steering column anti-theft device of a motor vehicle comprising:

a stator comprising a stator head having an opening and a clearance, the clearance extending radially outward from the opening and extending over a first angular sector;

a rotor movably mounted in rotation relative to the stator about an axis, the rotor comprising an annular collar and an extension, the annular collar extending radially outward of the opening, the extension extending axially from the annular collar and configured to be received in the clearance, wherein the annular collar and the extension are not moveable relative to each other;

a cam rotatably secured to the rotor; and an elastic element arranged between the cam and the rotor for axially biasing said rotor toward a predetermined axial position;

wherein when the rotor is in a predetermined angular position, the rotor is axially translatable between the predetermined axial position and a first axial position, wherein when the rotor is in the predetermined angular position and the predetermined axial position, a first stop of the clearance blocks the extension to inhibit rotation of the rotor in a first rotational direction, wherein when the rotor is in the predetermined angular position and the first axial position, the rotor is rotatable in the first rotational direction to a first angular position, and wherein when the rotor is in the first angular position, a key disposed in the rotor may be removed from the rotor and when the rotor is in the predetermined angular position, the key disposed in the rotor may not be removed from the rotor.

8. The lock according to claim 7, wherein the predetermined angular position is an intermediate angular position disposed between a neutral extreme angular position and an active extreme angular position.

9. The lock according claim 7, wherein the opening of the stator is shaped so that its cooperation with the annular collar enables rotation of the rotor in a direction of rotation opposite to the predetermined direction of rotation up to an active extreme angular position.

10. A steering column anti-theft device for a motor vehicle including a lock according to claim 7.

11. The lock according to claim 7, wherein the stator head has an axial stop retaining the rotor in the stator head when the rotor translates.

12. The lock according to claim 7, wherein the extension extends over a second angular sector that is less than the first angular sector.

13. The lock according to claim 7, wherein the first angular sector is bound by the first stop of the clearance and a second stop of the clearance.

* * * * *